United States Patent [19]

Advani et al.

[11] Patent Number: 4,556,954

[45] Date of Patent: Dec. 3, 1985

[54] METHOD FOR DISPLAYING SELECTED TEXT PROCESSING TASK OPTIONS CORRESPONDING TO THE CONTENTS OF THE COMBINED PROGRAM DISKETTE

[75] Inventors: Hira Advani; Gerald E. Hayes, both of Austin, Tex.

[73] Assignee: International Business Machines Corporation, Armonk, N.Y.

[21] Appl. No.: 652,440

[22] Filed: Sep. 20, 1984

Related U.S. Application Data

[63] Continuation of Ser. No. 311,088, Oct. 13, 1981, abandoned.

[51] Int. Cl.[4] ............................................. G06F 1/00
[52] U.S. Cl. ................................... 364/900; 364/300
[58] Field of Search ........................ 364/200, 900, 300

[56] References Cited

U.S. PATENT DOCUMENTS

| | | | |
|---|---|---|---|
| 3,757,037 | 9/1973 | Bialek | 340/712 |
| 4,213,189 | 7/1980 | Mueller et al. | 340/703 |
| 4,291,198 | 9/1981 | Anderson et al. | 364/900 |
| 4,403,303 | 9/1983 | Howes et al. | 364/900 |

Primary Examiner—James D. Thomas
Assistant Examiner—David L. Clark
Attorney, Agent, or Firm—R. E. Cummins

[57] ABSTRACT

A method is disclosed for assisting the operator of an interactive text processing system in the interactive selection of text processing tasks from a combined program/work diskette. The method involves displaying to the operator a "special" menu which is dynamically developed from information obtained during the creation of the combined program/work diskette, which menu reflects text processing task programs that have been combined on a combined program/work diskette. The combined program/work diskette is created by transferring to a diskette sets of programming modules where each set represents a different text processing task and originates from a different program diskette that is selected interactively by the operator during the creation of the combined program diskette. The special menu informs the operator what specific text processing tasks out of a large group of text processing tasks have been combined on the diskette and are now available to the operator for execution.

4 Claims, 6 Drawing Figures

```
xxxxxx yyyyyy                        Kyb 1
       COMBINE FEATURE SELECTION

YOUR      POSSIBLE
     ID   ITEM           CHOICE    CHOICES a    Asynchronous    2        1 = From Diskette Type 1
          Feature                  2 = Do Not Combine b    Binary Syn-     2        1 = From Diskette Type 1
          chronous                 2 = Retain from 2D
          Feature c    Filepack        2        1 = From Diskette Type 1
          Feature                  2 = Retain from 2D d    Mag Card        2        1 = From Diskette Type 1
          Feature                  2 = Do Not Combine e    SNA Feature     2        1 = From Diskette Type 1
When finished with this menu, press ENTER.  2 = Do Not Combine
Type ID letter to choose ITEM; press ENTER:
```

```
xxxxxx  yyyyyy ─────────────────────── Kyb 1 ──────
              COMBINED PROGRAM DISKETTE TASKS

ID    ITEM a     Textpack Program Diskette Tasks b     'first combined feature PDT' c     'second combined feature PDT' d     Other feature Program Diskette Tasks e     Go to Task Selection

Type ID letter to choose ITEM; presse ENTER:
```

FIG. 3

```
xxxxxx  yyyyyy ─────────────────────── Kyb 1 ──────
                      FEATURE TASKS

ID    ITEM a     'first combined feature' b     'second combined feature' c     Other Feature d     Go to Task Selection

Type ID letter to choose ITEM; press ENTER:
```

FIG. 4 xxxxxx yyyyyy _____ Kyb 1 _____
COMBINE FEATURE SELECTION

| ID | ITEM | YOUR CHOICE | POSSIBLE CHOICES |
|----|------|-------------|------------------|
| a | Asynchronous Feature | 2 | 1 = From Diskette Type 1<br>2 = Do Not Combine |
| b | Binary Synchronous Feature | 2 | 1 = From Diskette Type 1<br>2 = Retain from 2D |
| c | Filepack Feature | 2 | 1 = From Diskette Type 1<br>2 = Retain from 2D |
| d | Mag Card Feature | 2 | 1 = From Diskette Type 1<br>2 = Do Not Combine |
| e | SNA Feature | 2 | 1 = From Diskette Type 1<br>2 = Do Not Combine |

When finished with this menu, press ENTER.
Type ID letter to choose ITEM; press ENTER:

FIG. 5 xxxxxx yyyyyy _____ Kyb 1 _____
COMBINE LANGUAGE SELECTION

| ID | ITEM | YOUR CHOICE | POSSIBLE CHOICES |
|----|------|-------------|------------------|
| a | U.S. English | 2 | 1 = Languagepack<br>2 = 'second choice' |
| b | U.K. English | 2 | 1 = Languagepack<br>2 = 'second choice' |
| c | German | 2 | 1 = Language pack<br>2 = 'second choice' |
| d | Dutch | 2 | 1 = Languagepack<br>2 = 'second choice' |
| e | National French | 2 | 1 = Languagepack<br>2 = 'second choice' |
| f | Canadian French | 2 | 1 = Languagepack<br>2 = 'second choice' |
| g | Italian | 2 | 1 = Languagepack<br>2 = 'second choice' |
| h | Spanish | 2 | 1 = Languagepack<br>2 = 'second choice' |
| i | Swedish | 2 | 1 = Languagepack<br>2 = 'second choice' |
| j | Finnish | 2 | 1 = Languagepack<br>2 = 'second choice' |
| k | Danish | 2 | 1 = Languagepack<br>2 = 'second choice |
| l | Norwegian | 2 | 1 = Languagepack<br>2 = 'second choice' |

When finished with this menu, press ENTER.
Type ID letter to choose ITEM; press ENTER:

FIG. 6

METHOD FOR DISPLAYING SELECTED TEXT PROCESSING TASK OPTIONS CORRESPONDING TO THE CONTENTS OF THE COMBINED PROGRAM DISKETTE

This is a continuation of application Ser. No. 311,088 filed Oct. 13, 1981, now abandoned.

DESCRIPTION

1. Background of the Invention

This invention relates in general to interactive text processing systems and, in particular, to an improved method for assisting the operator to interact with the system when a combined program/work diskette is employed in the system.

2. Related Applications

U.S. Pat. No. 4,477,880 Ser. No. 311,083 is directed to an improved method for creating a single 2S2D (two sided, double density) "combined program" diskette by interactively selecting individual programs that are stored on a plurality of 1S1D program diskettes. The resulting diskette is referred to as a "combined-program" diskette or a "combined-program/work" diskette if it is also used to store working text files.

U.S. Pat. No. 4,498,142 Ser. No. 311,113 is directed to an improved method for replacing one of a plurality of programs stored on a combined program/work diskette with an updated version of the program stored on a 1S1D program diskette.

3. Description of Prior Art

The prior art has disclosed a number of interactive text or word processing systems. Generally these systems comprise a display device, a keyboard, a microprocessor, a printer, and one or more diskette drives. The function of the diskette drive is to transfer to the volatile memory of the microprocessor one or more programs which interrelate to various hardware components of the system and which permit one or more text processing applications to be run on the system.

Some systems include a modem device for communicating with other word processing or even data processing systems. Most systems provide the operator with a displayed "menu" from which one or more selections can be indicated by the operator merely by typing a character or symbol on the keyboard and activating an "enter" key. Depending on the character entered into the system, the microprocessor may display a further "menu". The process is repeated until all of the data required by the system to perform a desired text processing task has been entered into the system.

One part of the program which has been entered into the system from the diskette is concerned primarily with establishing the normal interaction of the various components of the system. For example, a subroutine will normally provide for taking the signals represented by a single keystroke and transferring that byte of data to the microprocessor. Another subroutine will cause the character to be displayed on the screen at a location specified by the display cursor. Subroutines and programs which provide such functions are generally referred to as system control programs, whereas the programs that are unique to a particular text processing application, such as the creation of a document, are referred to as application programs.

As basic text processing systems have become more widespread and the number of installations have increased, the ability to economically support new application programs directed to features which enhance the basic program have improved to the point that for most text processing systems that are presently installed, a large number of different feature programs and options are available and new feature programs become available on a regular basis.

The manner in which these new feature programs are introduced into the marketplace and the manner in which updates to existing programs reflecting corrections are handled, result in an increase in the amount of diskette handling required by the operator and is the cause for concern that errors will occur and efficiency will decrease in proportion to the number of diskettes that are required. In addition, the proliferation of feature diskettes adds to the level of confusion for the unskilled operator.

The problem originates primarily in the system hardware because most early systems had a diskette drive that operated with a diskette cartridge which recorded on only one side of a disk. Subsequently, diskette drives and cartridges were marketed in which the amount of data stored on one side of the diskette was doubled. More recently, diskette drives and cartridges have been marketed in which both sides of the diskette are recorded at a double density, resulting in a storage capacity four times the capacity of the original diskette.

Since each new feature program is generally separately priced, the industry has found it expedient to record only one feature program on a diskette along with the necessary control program for getting the program into the system to display its various menus, etc, and to interact with the basic text processing program.

The result is that the operator is presented with one diskette for each feature and where the text processing task being run by the operator utilizes a number of these features, considerable time is spent by the operator in changing diskettes. For example, assume in addition to the basic text processing program, the operator is provided with three additional feature programs on three separate diskettes. Assume for example that one program provides the communication function to be done by the operator interactively with the system. That feature provides the ability to communicate with another terminal specified by the operator. Another diskette contains a program for recording the type text on magnetic cards which then can be played out on magnetic card typewriters. The third diskette contains the third feature program which allows the operator to establish data processing type files such as a name and address list.

If the memory of the microprocessor was capable of storing all the data on the three diskettes, then there would be no major problem. However, this is technically not economical in that volatile memories which operate at the speed of the microprocessors in reading and writing data are currently much too expensive for the amount of data that must be stored. The operator is, therefore, faced with the problem of changing programming diskettes as the various program applications are required in any text processing application that is being run. The problem becomes even more complex when the system has only one diskette drive which must share the work diskette with the program diskette.

The invention described and claimed in related application Ser. No. 311,083 U.S. Pat. No. 4,477,880 is directed to a method to reduce the amount of diskette handling by the operator by creating one new diskette which combines the programming and other data desired by the operator from a number of separate diskettes.

The method involved in creating a combined program diskette starts with the step of displaying to the operator a menu which reflects all processing tasks that the system is capable of performing. The menu is displayed as a result of reading an IPL program into the system along with a "combine" program which displays the menu and which guides the operator through a series of diskette insertions and removals. Depending on the various processing tasks that the operator selects from the menu, programs are transferred to the 2S2D destination diskette from the 1S1D source diskette. In addition to transferring the specific task programs from the various source diskettes to the destination diskette, information that had previously been entered into the system by the operator and stored on the individual source diskettes, for example, format and setup information on certain type documents, may also be transferred to the 2S2D destination diskette from the 1S1D feature program source diskettes.

The number of diskette changes required by an operator of an interactive text processing system using a "combined program" diskette is reduced considerably. Details of that system may be found in the referenced related copending application Ser. No. 311,083 which for completeness is incorporated herein by reference.

While the 2S2D "combined program/work" diskette described above solves the problem of the operator spending time changing diskettes, it only has the capability of displaying to the operator those menus which existed on the individual 1S1D diskettes and which menus were transferred to the 2S2D diskette. The operator must, therefore, remember for example what features and language dictionaries were originally transferred to the 2S2D "combined program/work" diskette. If the operator is not familiar with the diskette, a trial and error approach using prompts and the existing menus may be employed, but this involves considerable operator time and expertise in interpreting the responses that the system will provide when a request is made for a particular task where none exists on the diskette which has been used to IPL the system.

The present invention is directed to a method to avoid the above problem. The method involves displaying to the operator one or more menus which reflect to the operator those feature task that exist on the "combined program" diskette and are presented as separate selectable options by newly developed menus.

The new menus which are unique to the specific 2S2D "combined program/work" diskette are displayed with the appropriate options because they are dynamically created by the system by subroutines "of the combined program" which employ identifying data entered by the operator in the process of selecting each transferred program. The identifying data is used to select the appropriate literal text to be displayed for that menu from a table of all possible text options that is also part of the "combined program" dynamic menu developing subroutines.

SUMMARY OF THE INVENTION

It is, therefore, an object of the present invention to provide an improved method for displaying to the operator of an interactive text processing system a menu which lists only specific tasks whose program sets are stored on a "combined program/work" diskette.

A further object of the present invention is to provide an improved method for an operator to interactively enter task selection data into an interactive test processing system in which a "combined program/work" diskette is a source of programs for performing a plurality of different test processing tasks.

The foregoing and other objects, features and advantages of the present invention will be apparent from the following more particular description of a preferred embodiment of the invention as illustrated in the accompanying drawings.

BRIEF DESCRIPTION OF THE DRAWINGS

FIG. 3 illustrates the program diskette tasks menu which is displayed to the operator in accordance with the present invention;

FIG. 4 illustrates a feature menu which may be conditionally displayed to the operator of the system shown in FIG. 1 in accordance with the present invention;

FIG. 5 illustrates a combined feature selection menu that is developed by the system for use by the operator during an update task;

FIG. 6 illustrates a combined language selection menu for use during an update task.

DESCRIPTION OF THE PREFERRED EMBODIMENT

Figure 1:
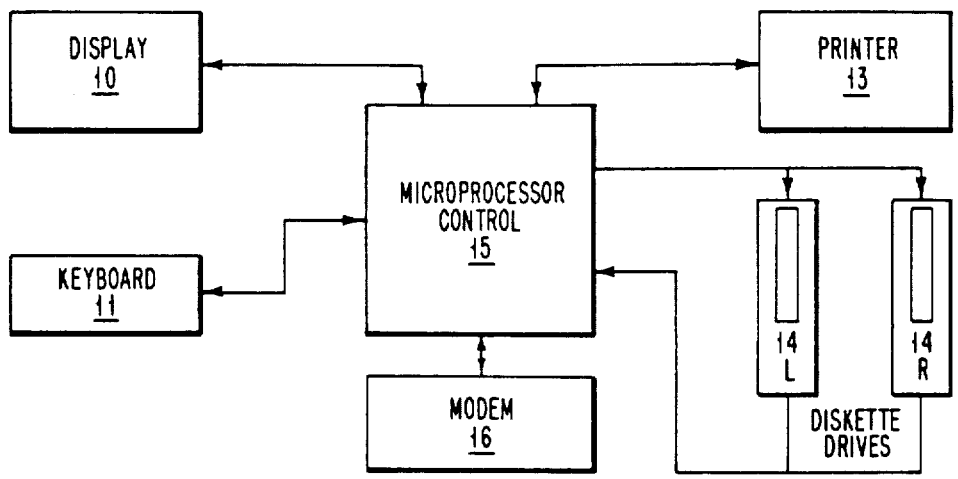
FIG. 1 is a functional block diagram of an interactive text processing system in which the method of the present invention may be employed.

With reference to FIG. 1, a typical interactive text processing system is illustrated in which the method of the present invention is advantageously employed. The major components of the system shown in FIG. 1 comprise the display device 10, the keyboard 11, the printer 13, the diskette storage devices 14L and 14R, and the microprocessor 15 which includes an internal memory for storing programs and data entered from the keyboard 11 or from the diskette storage devices 14L and 14R. Device 14 functions to store data on either a single-sided diskette at density D1 only or to store data on a two-sided diskette at double density D2. The 2S2D (two sided, double density) diskette, therefore, can store approximately four times the information stored on the 1S1D (one sided, single density) diskette. A modem 16 is also shown in FIG. 1 and functions to permit the system to communicate with other similar text processing systems or to a data processing system.

Reference should be made to the cross-referenced application for a complete description of the operation of the system shown in FIG. 1. As described therein, the system can be operated from programs stored on a plurality of separate 1S1D program diskettes where, in essence, a separate text processing task is on each diskette. Alternately, the system can operate from a combined program/work diskette on which selected programs from the 1S1D diskettes have been selectively transferred and combined on a 2S2D type diskette, hereinafter referred to as the combined program/work diskette.

As described in detail in the cross-referenced application, various programs are combined onto the 2S2D diskette in accordance with a "Combine" program that is entered into the system from a 1S1D source diskette which, in practice, has been packaged as part of the highest version of the basic program. The "Combine"

program guides the operator interactively through a sequence of menus from which selections are made, and also prompts the operator to insert and remove specifically identified 1S1D program diskettes at the appropriate time so that task program sets corresponding to the tasks selected from the displayed menus will be transferred to the 2S2D destination diskette and so that the appropriate housekeeping data will also be generated by the system and stored on the 2S2D diskette so as to permit the transferred programs to be subsequently selected and entered into the system from the single 2S2D "Combine program" diskette.

The 2S2D "Combine program" diskette is also used as a work diskette since, from a practical standpoint, the subset of selected task programs for a given text processing application does, in most situations, leave considerable amount of working storage space on the 2S2D combined diskette.

Figure 2:
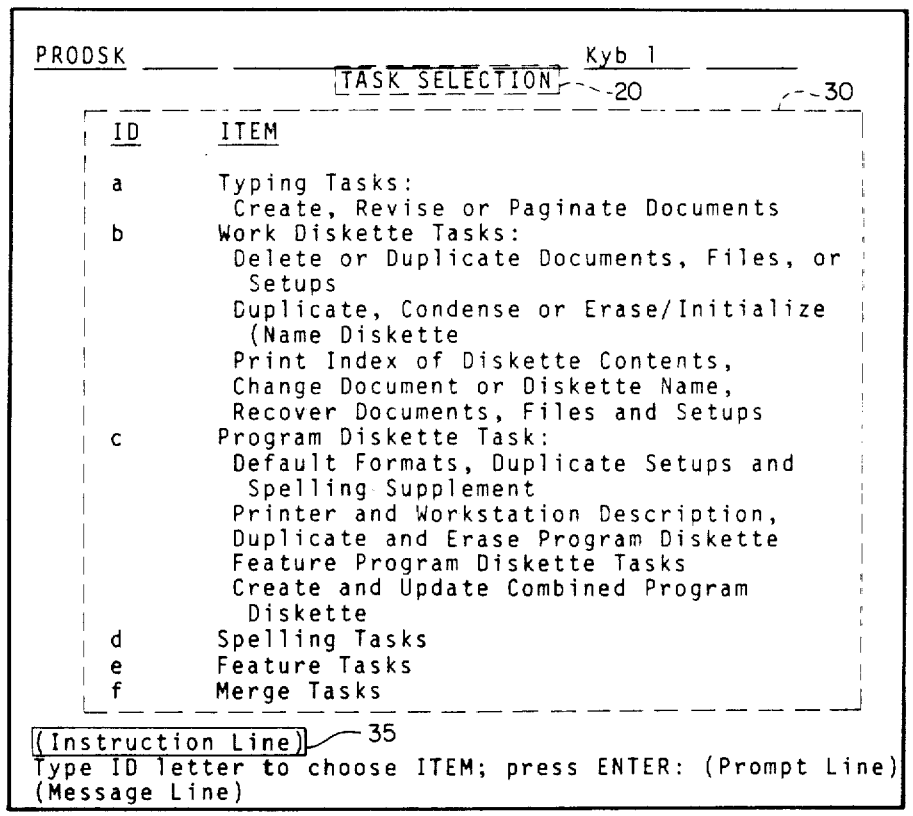
FIG. 2 illustrates the general format of a typical menu displayed in the system shown in FIG. 1.

In order to better understand how the menus shown in FIGS. 3 and 4 are developed dynamically by the system, a short explanation of the menu format and functional portions will first be provided in connection with FIG. 2.

The simple menu shown in FIG. 2 has three major functional areas or fields. The first is the name field, surrounded by dotted line box 30 and, which in this instance, contains the menu name "Task Selection". The second major area is referred to as the option area or option field and includes the data contained in the dotted line box 30 in FIG. 2.

The last area is the information text area which contains the instruction "Type ID letter to choose Item; press ENTER". This area is designated by the box which is referred to by reference character 35.

The menu "option area 30" can take several forms. The "parameter" option form shown in FIG. 2 comprises at least two required columns, namely, the ID column 31 and the item (name, task, function) column 32. Optional column labels as shown in FIGS. 5 and 6 are "Your Choice" and "Possible Choices". The ID column 31 contains a one letter graphic, usually an alpha character, that is used by the operator to indicate to the system a selection of the corresponding option by typing that letter on the keyboard. It is this interaction of the operator and the system together with the relationship of the letter or character in column 30 to the text in Item Column 32 which distinguishes a "menu" from a conventional directory frame or screen. The item column is strictly an information column to identify the nature of the option. The "Your Choice" column is employed in some menus such as FIGS. 5 and 6 and is generally employed where there are two possible choices, such as shown below:

| ID | Item | Your Choice | Possible Choices |
|----|------|-------------|------------------|
| g | Ring bell | 1 | 1 = Yes; 2 = No |

The other form of menu option is the "directive option" list which is used to present another menu or extend the existing menu. That format uses only two columns. FIG. 2 is a typical example of this type format. Other forms of options are provided but are not pertinent to the present description.

The information test area 35 is disposed between the option area and the "prompt line". It may contain one or more lines of text instruction or information. The information area is followed by the prompt line.

The information that is presented on the screen of the display device of an interactive text processing system is the result of text characters being transferred from predetermined locations in the display buffer under the control of the microprocessor. The data being displayed originates either from the keyboard or from data stored on the diskette and was also transferred to the buffer under the control of the microprocessor. The transfer of menu type data from the program diskette to the display buffer is controlled by a suitable subroutine which is part of the basic system control programs that are read into the system after it has been powered on and IPLed by the appropriate disk.

The combined program diskette task menu shown in FIG. 3 is displayed as a result of the operator selecting option "c" from the task selection menu of FIG. 2 when the system has been IPLed from a 2S2D "combined program/work" diskette. The initial task selection menu that is displayed from the 2S2D "combined program/work" diskette is identical to the task selection menu that is displayed in FIG. 2 when a system is IPLed from a 1S1D basic program diskette. That menu was merely transferred "as is" from the 1S1D program diskette to the "combined program" diskette as distinguished from being dynamically created in accordance with the present invention. The tasks identified in the menu of FIG. 2 opposite each character in the 10 column are effectively all of the major type processing tasks which the system can handle.

The program diskette task option "c" is selected on the initial task selection menu FIG. 2 by the operator when the operator wants to modify in some way either the basic programming tasks or features programming tasks. As a result of selecting option "c", the menu shown in FIG. 3 is displayed which is in effect an extended type menu format. If option "a" is then selected by the operator from the menu shown in FIG. 3, the following menu is displayed.

| PRODSK | | Kyb 1 |
|---|---|---|
| TEXTPACK PROGRAM DISKETTE TASKS | | |
| ID | ITEM | |
| a | Change Document Format Defaults | |
| b | Change Alternate Format Defaults | |
| c | Change Printer Description | |
| d | Change Work Station Description | |
| e | Duplicate Machine Setup | |
| f | Duplicate Program Diskette | |
| g | Erase Program Diskette | |
| h | Duplicate Spelling Supplement | |
| i | Change Arithmetic Format Defaults | |
| j | Create New Combined Program Diskette | |
| k | Update Combined Program Diskette | |
| l | Go to Task Selection | |

(Instruction Line)
When finished with this menu, press ENTER. (Prompt Line)
(Message Line)

MENU 1

If option "b", on the other hand, is selected by the operator from the menu shown in FIG. 3, then the feature program diskette task menu unique to that feature which is selected is displayed. The data for that menu originated on the 1S1D feature program diskette and was transferred to the 2S2D combined program diskette during the creation of that diskette.

If option "c" is selected by the operator from the menu shown in FIG. 3, then similarly a feature program diskette task menu unique to that feature is displayed as with option "b".

Whatever program diskette task option is selected from each of these unique menus, the system proceeds to execute that task.

The menu, as shown in FIG. 3, includes an option labelled "d" which provides a vehicle for the operator to insert a 1S1D feature diskette into the system at this point in the event the feature that is desired was not combined on the 2S2D diskette. The details of how this is achieved are described in the cross-referenced application Ser. No. 311,087 now abandoned.

The combine program described in the cross-reference application Ser. No. 311,083 also includes a specific subroutine for dynamically developing an additional menu which is shown in FIG. 4 in the drawings and which is unique to the specific 2S2D combined program diskette. The menus of FIGS. 3 and 4 are generated by the system dynamically and are not transferred as is during creation of the "combined program" diskette. When an option from a prior menu is selected menus 3 and 4 are created dynamically using the table entries stored during the creation of the 2S2D combined program diskette in accordance with the data that is entered interactively into the system by the operator and data that is transferred to the system from the various 1S1D diskettes involved in the combine operation.

The menu shown in FIG. 4 is displayed in response to the operator selecting option e, "feature tasks", on the menu of FIG. 2.

It will be recalled that option "c" on the task selection menu involved tasks that affected the programs stored on the diskette. Option "e" on the task selection menu is selected when the operator wants to perform a specific text processing task on a text file stored on the disk rather than a program stored on the disk.

While the information that is displayed on each specific menu of FIG. 3 and FIG. 4 could be stored together in memory and transferred to the display buffer as a complete entity, it is generally more efficient from a memory storage standpoint to build each menu from a group of tables since a number of menus uses the same phrases and vice versa. The use of tables also allows additions and changes to be made with a minimum adverse effect on other areas of the system.

The menu shown in FIG. 3 is displayed to the operator when option c is selected from the task selection menu. The FIG. 3 menu is developed and displayed in a manner similar to the other menus in that the various entries, such as the title, ID characters, and item descriptions are transferred from various tables in memory where each of the literal text phrases is actually stored. The literal text shown as option "a" in FIG. 3 for example, text program diskette tasks is a menu name which appears in a stored table of menu names. The program which develops this menu of FIG. 3 transfers the literal text from the table to the display buffer where it appears as option a.

The description of options b and c in FIG. 3 namely 'first combined feature PDT' and 'second combined feature PDT' do not actually appear on the menu. These two lines are actually the only part of menu 3 which changes in accordance with what programs have been previously combined on the 2S2D combined program diskette and which make it necessary for the menu of FIG. 3 to be generated dynamically. In practice, the list of menu names that are stored on the 2S2D combined program diskette does include the actual text that will appear as options b and c on menu 3. The address of these menu names in the menu name table are supplied to the control block for this menu when the menu is to be displayed. The literal text for options d and e in FIG. 3 does not change. However, the ID numbers for these options will vary depending on the number of feature programs that have been transferred previously to the "combined/program" diskette. Therefore, these ID numbers will be assigned dynamically as will the text for items b and c under program control for each "combined program/work" diskette as it is created.

The function of menu 3 is to permit the operator to select the feature program diskette task menu that will be displayed as if the system was operated under the control of a 1S1D feature program diskette. In other words, selection of options b or c on the FIG. 3 menu results in menus being displayed that are exactly the same as the respective feature program diskette task menus that would be displayed from the 1S1D feature program diskette.

The function of menu 4 is to permit the operator to select one of the combined feature task menus for display so that the operator can select the displayed options from the menu as if the feature task menu had been displayed from a 1S1D feature program diskette. In summary, menu 3 involves tasks relating to the feature programs while menu 4 involves tasks relating to text processing, corresponding to the features.

The menus displayed in FIGS. 5 and 6 are also created on a dynamic basis during the creation of the 2S2D program/work diskette. These menus are displayed only during the "update" task as described in cross-referenced application Ser. No. 311,113. As explained in that application the "update" task involves updating a feature program that is stored on the "combined program/work" diskette. Feature programs distributed on 1S1D type diskettes are often updated and reissued to correct minor programming bugs or to enhance some aspect of the feature task. It is therefore important to be able to update the feature on a "combined program/work" diskette. The combined feature selection menu shown in FIG. 5 is displayed in response to the operator having first selected option c on a task selection menu, i.e., program diskette tasks, such as shown in FIG. 2 and then selecting the "update combined program" option "k" from the textpack program diskette task menu on page 11. The FIG. 5 menu lists all features that are available to the system. The portion of the menu in FIG. 5 that is dynamically created involves the possible choices column, and more specifically, text which is positioned after "2=" for each option "a" through "e" in FIG. 5. The text "second choice" as shown in FIG. 6 is not actually displayed but instead, one or two literal text messages are displayed. The first message as shown in FIG. 5 is "Retain from 2D" which is an indication that the corresponding program is on the 2S2D diskette. The second message is "Do Not Combine" which is an indication that the feature was never transferred to the 2S2D diskette. The choice as to which text message is displayed in FIG. 5 is based on information that is created during the creation of the 2S2D diskette as to the features that are transferred to the 2S2D diskette. The menu of FIG. 5, specifically the text for the number "2" choice is developed based on that data.

FIG. 6 is displayed immediately after the menu shown in FIG. 5 when the system is in an update mode and, again, is unique to the update task. The function of FIG. 6 is to display to the operator those language dictionaries that have been combined on the 2S2D diskette. This is accomplished in the identical manner as in the FIG. 5 menu where the second choice column actually displays the "Retain from 2D message when the language dictionary is present on the 2S2D diskette or a "Do Not Combine" message when the language dictionary has not been previously combined on the 2S2D diskette.

While the menu shown in FIG. 6 has the "second choice" following the "2=" statement, it should be understood that one or the other of the two text phrases mentioned above are actually dynamically inserted in the menu on the line following the phrase "2=" statement.

In summary, the method of the present invention contemplates the creation of menus on a dynamic basis in order to assist the operator in the interactive selection of processing tasks from a "combined program/work" diskette. In one instance, menus are dynamically completed to assist the operator during the task of updating a program stored on a "combined program/work" diskette. In the second instance, menus are developed dynamically to assist the operator in selecting tasks corresponding to programs that are stored on the "combined program/work" diskette. Both sets of menus result in increased operator efficiency and system throughout.

While the invention has been particularly shown and described with reference to a preferred embodiment thereof, it will be understood by those skilled in the art that various other changes in the form and details may be made therein without departing from the spirit and scope of the invention.

Having thus described our invention, what we claim as new and desire to secure by Letters Patent is:

1. In an operator controlled interactive text processing system having a keyboard, a display device, and a diskette drive for entering programs into said system, said system performing text processing tasks that are selected by said operator interactively from menus which are displayed by said system to said operator from portions of programs entered into said system from a "combined-program" diskette, said "combined-program" diskette having a set of selected text processing task programs that were previously transferred from a plurality of different program source diskettes, said selected set comprising some but not all of said text processing task programs initially stored on said different program source diskettes so that some menus associated with said programs on said different program source diskettes are no longer valid to guide said operator through a series of text processing task programs corresponding to said set of transferred programs, said "combined-program" diskette further including a table of data that is captured during the creation of said "combined-program" diskette which indicates to said system each said transferred text processing task program in said selected set, an improved method of assisting said operator in the interactive selection of text processing tasks when said "combined-program" diskette is employed to control said system, said method comprising the steps of (1) displaying to said operator a first stored menu which includes a plurality of options each of which is defined by (a) an ID character and (b) a literal text description of the option and which corresponds substantially to a menu which was stored on at least one of said plurality of different program source diskettes and (2) developing the information format and content for a second menu dynamically with said system prior to display, (a) in response to keying into said system from said keyboard one of said ID characters when said first menu is displayed to select one option from said menu displayed in step (1) to cause said system to display said second menu, said second menu including a plurality of options, each of which is also defined by (i) an ID character and (ii) a literal text description of the option, and (b) in accordance with said data stored in said table during the creation of said "combined-program" diskette so that said second menu is unique to the specific and "combined-program" diskette and displays only valid options to subsequent text processing tasks corresponding to said selected set of transferred programs and invalid options corresponding to text processing task programs that were not transferred to said "combined-program" diskette during its creation are not displayed on said second menu.

2. The method recited in claim 1 in which said first stored menu displayed in step (1) is a task selection menu which lists all text processing tasks available to the system and said second menu includes a plurality of options in which said literal text description of each said displayed option corresponds to the name of a different one of said set of said selected text processing task programs that were transferred to said "combined-program" diskette.

3. In an operator controlled interactive text processing system having a keyboard, a display device, and a diskette drive for entering programs into said system, said system performing text processing tasks that are selected by said operator interactively from menus which are displayed by said system to said operator from portions of programs entered into said system from a "combined-program" diskette, said "combined-program" diskette having a set of selected text processing task programs that were previously transferred from a plurality of different program source diskettes, said selected set comprising some but not all of said text processing task programs initially stored on said different program source diskettes so that some menus associated with said programs on said different program source diskettes are no longer valid to guide said operator through a series of text processing task programs corresponding to said set of transferred programs, said "combined-program" diskette further including a table of data that is captured during the creation of said "combined-program" diskette which indicates to said system each said transferred text processing task program in said selected set, an improved method of assisting said operator in the interactive selection of text processing tasks when said "combined-program" diskette is employed to control said system, said method comprising the steps of (1) displaying sequentially to said operator at least three separate menus, each of which includes a plurality of operator selectable options, each of said options being identified by an ID character and a literal text description of said option, said first and third menus of said sequence substantially identical to corresponding means stored on said program source diskettes, (2) developing with said system the format and content of said second menu in said sequence based on the data captured during creation of said "combined-program" diskette and stored in said table and in response to selecting one of said options being displayed on said first menu by keying in its ID character to cause the display of said second said menu, whereby said second menu is always unique to said "combined-program" diskette and, (3) selecting one of said options being displayed on said second menu by keying in its ID character to cause the display of said third menu, (4) selecting an option on said third menu by keying in its ID character to cause the text processing task program defined by the literal text of said selected option to be transferred to said system from said "combined-program" diskette.

4. A method of assisting an operator of an interactive text processing system in the interactive selection through a keyboard of text processing task programs from a "combined-program" diskette, said method comprising the steps of (1) displaying sequentially to said operator a plurality of menus which guide the operator through a sequence of text processing tasks which requires said system to execute in sequence a plurality of text processing task programs that have been previously transferred to and stored on said "combined-program" diskette selectively from a plurality of separate program source diskettes, each said text processing task program stored on said "combined-program" diskette having its own menu which is displayed to said operator in response to entry through said keyboard by said operator of ID data presented to said operator from a previously displayed menu which is unique to said "combined-program" diskette, said step of displaying including the step of developing with said system the format and content of the literal text description of the operator selectable options for at least one of said previously displayed unique menus, in accordance with data obtained at the time said text processing task programs were selectively transferred.

* * * * *